Patented Sept. 29, 1931

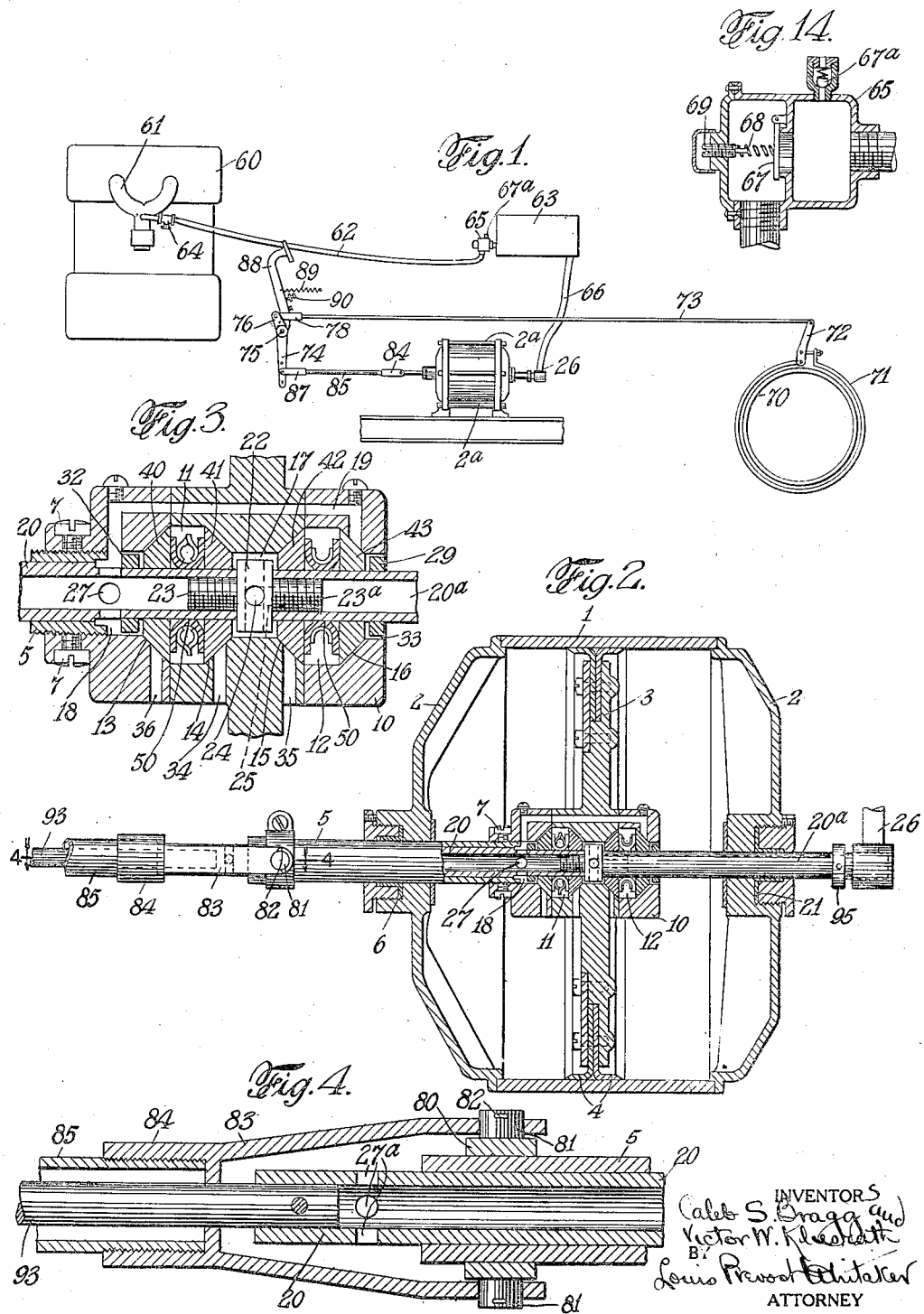

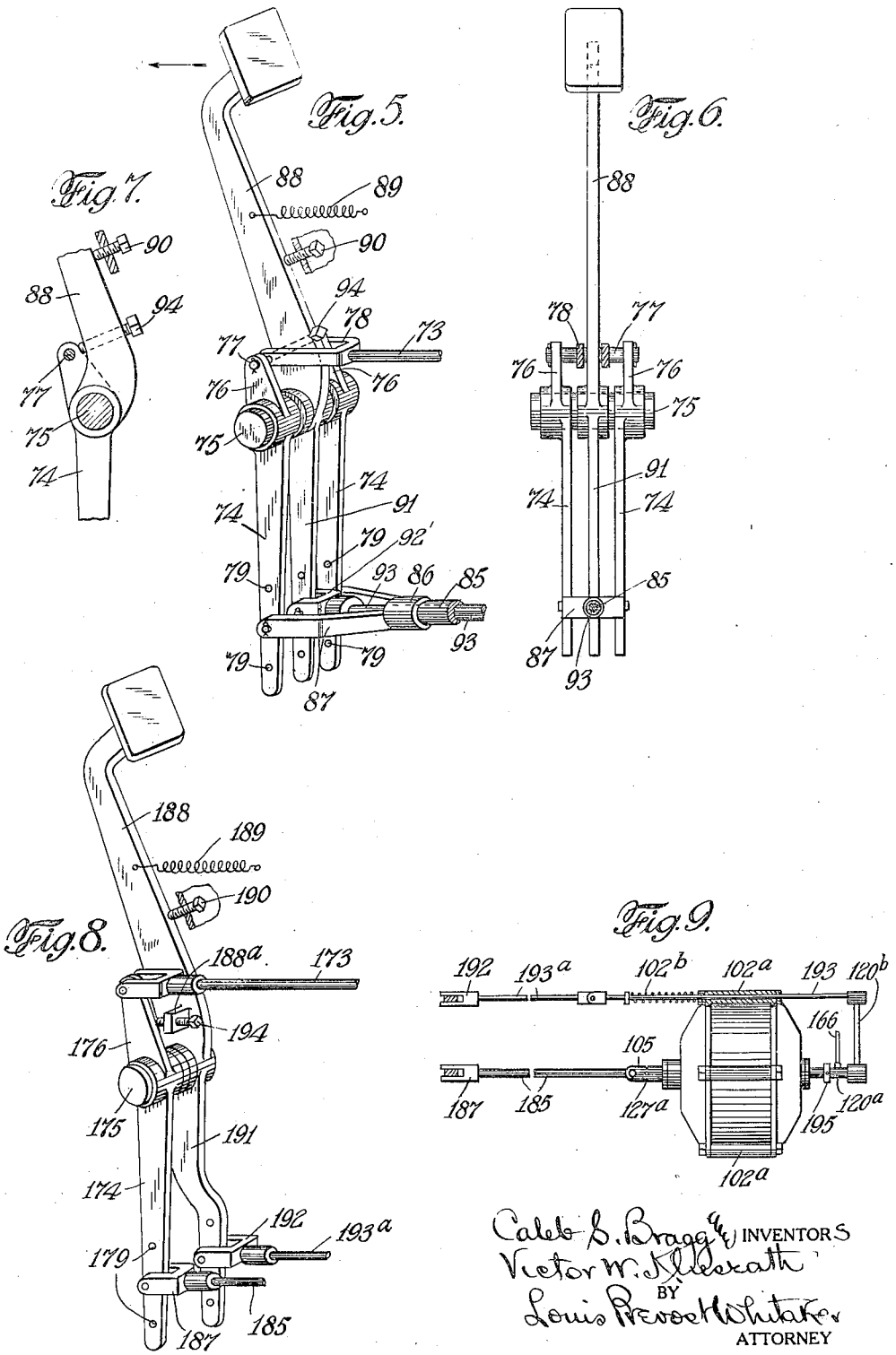

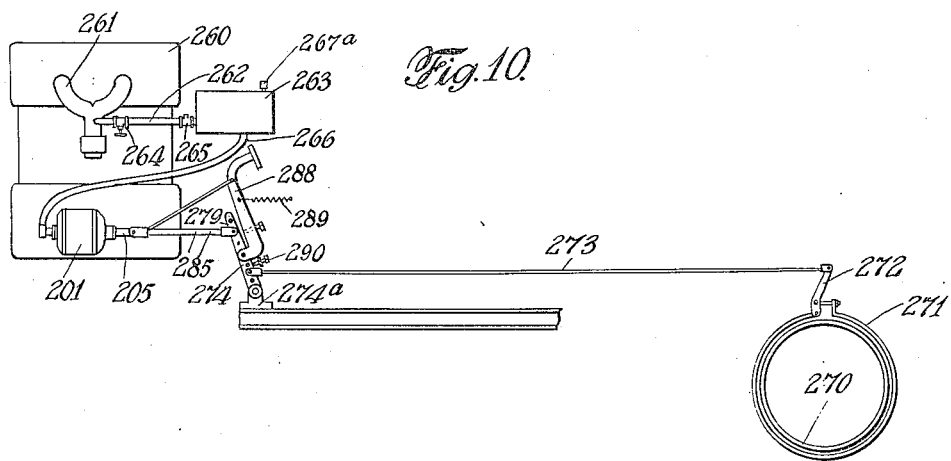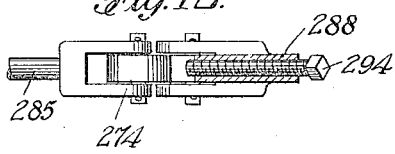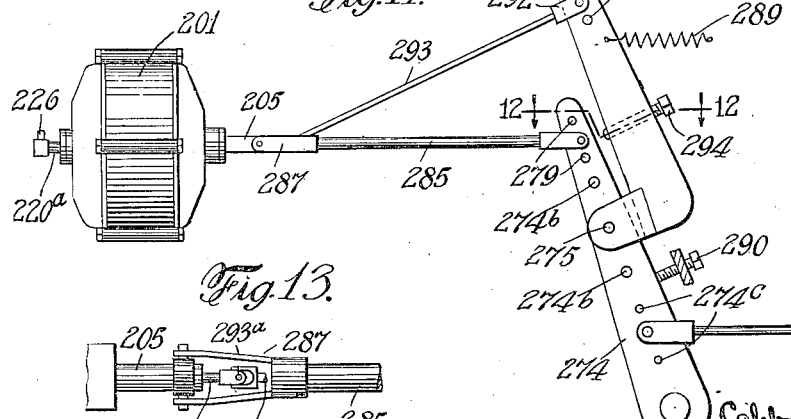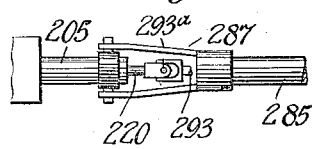

1,824,980

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE ACTUATING MECHANISM

Application filed December 8, 1924. Serial No. 754,484.

Our invention consists in the novel features hereinafter described, reference being had to the accompanying drawings, which illustrate several embodiments of the same, selected by us for purposes of illustration, and the said invention is fully disclosed in the following description and claims.

Our present invention relates to the installation of a power actuator of the general type illustrated in our prior application filed December 22, 1923, Serial No. 682,346, in connection with the brake mechanism or other part to be actuated, of an automotive vehicle, which is ordinarily actuated manually by a hand lever or foot lever, or pedal, or other operator operated device. Such power actuators comprise among their members, a cylinder having a double acting piston therein operated in both directions by establishing differential pressures on opposite faces of the piston and provided with reversing valve mechanism usually located in the piston itself and constructed to maintain the piston in a balanced condition when the valve mechanism is in normal position. The differential pressures necessary for the actuation of these power actuators may be furnished in any usual or preferred manner, but are most conveniently obtained from the internal combustion engine with which the automotive vehicles are ordinarily provided and which in their operation continually provide such differential pressures. For example, the suction passage existing in such an engine between the throttle valve and a cylinder, or cylinders, of the engine, provides a convenient means for obtaining a moderate degree of rarefaction which may be estimated as a partial vacuum of approximately 20 inches of mercury, and by connecting the valve mechanism with the intake manifold of the engine as the source of low pressure, and with the atmosphere as the source of higher pressure, such power actuators can be very conveniently and economically operated. The engine cylinder also provides a source of higher pressure than atmosphere which may be utilized if desired in conjunction with atmospheric air as the low pressure fluid, or we may employ both pressure and vacuum if preferred, as set forth in our former application above referred to. In the installation of these power actuators in automotive vehicles, it has been proposed to insert them directly in the connections between the operator operated device and the part, as the brake mechanism, to be actuated, and this is a convenient arrangement where the power of the actuator is entirely adequate to insure the proper operation of the brake or other mechanism to be operated. Where suction is relied upon for the low pressure, in connection with atmospheric air at a pressure of approximately 15 pounds per square inch as the high pressure, the amount of power exerted by an actuator of given size is necessarily limited and in the operation by suction of brake mechanism for the very heavy automotive vehicles, such as buses, trucks and the like, if the actuator is placed directly in the connections or linkage between the operator operated part and the brake or other mechanism to be actuated, it might become inconvenient or uneconomic to instal an actuator having a cylinder and piston of sufficient size or area to provide the necessary power required. In such cases we propose, in carrying out our present invention, to interpose an actuating lever independent of the operator operated device between the actuator piston and the brake or other mechanism to be operated, and to provide suitable means for multiplying the power of the actuator exerted through said lever and also to provide means for adjusting the leverage between the actuator and the part to be actuated, so as to provide for the requirements of the particular installation without unduly increasing the size of the actuator. Our invention also includes a connection from the operator operated part to the reversing valve mechanism of the actuator, and a provision for lost motion between the operator operated part and said actuating lever, whereby the operator operated part may be moved a distance sufficient to actuate the reversing valve mechanism without affecting the operating lever, after which it will assume a position in which it is operatively connected with the actuating lever, so that the physical force of the operator may be added to the power of the actuator itself, and so that, should the power fail, the operator may nevertheless operate the brake or other mechanism by physical force through the actuating lever, having previously set the reversing valve mechanism in the required position to permit the movement of the actuator piston by means of the operator operated part. Our invention also contemplates certain other features of construction hereinafter described and particularly pointed out in the claims.

Referring to the accompanying drawings, in which we have illustrated several forms of our invention, selected by us for purposes of illustration.

Fig. 1 is a diagrammatic representation showing one of our power actuators connected with the suction passage of an internal combustion engine of an automotive vehicle and operatively connected to the brake mechanism thereof and embodying our present invention.

Fig. 2 is an enlarged sectional view illustrating one form of power actuator shown in Fig. 1.

Fig. 3 is an enlarged detail sectional view of the reversing valve mechanism of the actuator shown in Fig. 2.

Fig. 4 is an enlarged sectional view on the line 4—4 of Fig. 2.

Fig. 5 is an enlarged perspective view showing in detail the operator operated part or foot lever, the associated brake applying lever or levers, and their connections.

Fig. 6 is an elevation of the parts shown in Fig. 5.

Fig. 7 is a detail view of parts of the mechanism illustrated in Figs. 5 and 6.

Fig. 8 is an enlarged perspective view similar to Fig. 5, illustrating a modification.

Fig. 9 is a plan view drawn to a smaller scale showing the arrangement of the piston rod and valve operating rod connections for use in connection with the form of mechanism illustrated in Fig. 8.

Fig. 10 is a diagrammatic view similar to Fig. 1, showing another modification of our invention.

Fig. 11 is an enlarged side elevation of the actuator, the brake applying lever, the foot lever, and the connections between said levers and the piston rod and valve actuating sleeve respectively shown in Fig. 10.

Fig. 12 is a section on line 12—12 of Fig. 11.

Fig. 13 is an enlarged top plan view of a portion of the connections illustrated in Fig. 11.

Fig. 14 is an enlarged view of a modified form of check valve which we prefer to use between the suction device and the actuator.

In Fig. 1 of the accompanying drawings we have shown a power actuator adapted to be operated by suction from the intake manifold of the internal combustion engine of an automotive vehicle, and operatively connected with the brake mechanism of the vehicle in such a manner that the piston of the actuator is connected to the brake mechanism through power amplifying means, the actuating mechanism for the reversing valve mechanism of the actuator being connected to an operator operated part, in this case a foot lever having a limited movement independently of the power amplifying lever, but so constructed that the physical force of the operator can be applied to the brake mechanism in addition to that of the power actuator when desired, and so that the brake mechanism may be operated by the physical power of the operator in case of failure of the power actuator for any reason. The particular construction of power actuator herein shown and described, forms no part of our present invention as the same is covered by our former application for Letters Patent of the United States, filed November 22, 1924, and given Serial No. 751,481, but in order that our present invention may be properly understood, we will briefly describe the construction and operation of the power actuator shown herein in connection therewith.

Referring therefore, to Figs. 2 and 3, which show the actuator in section, and an enlarged detail section of the reversing valve mechanism respectively, 1, represents the cylinder of our improved actuator closed at its opposite ends by heads, 2, connected by tubular bolts, 2ª, preferably tubular bolts and nuts. 3, represents the double acting piston provided with oppositely disposed gaskets, 4, 4. 5 represents a hollow piston rod which extends through a stuffing box, 6, in one end of the cylinder, and is provided at its inner end with threaded portions screwed into the hub of the piston and secured by set screws, 7. The hub, 10, of the actuator piston is provided with two valve chambers, 11 and 12, respectively, each of which is provided with two valve seats, preferably conical and concentric to the axis of the piston. The valve chamber, 11, is shown as provided with conical valve seats, 13 and 14, and the valve chamber 12 is similarly provided with valve seats, 15 and 16. The piston hub is provided in this instance between the valve chambers with an outlet or lower pressure chamber, indicated at 17, which communicates with each of the valve chambers through the valve seats, 14 and 15, respectively. The piston hub is also provided with a higher pressure chamber, 18, (in this instance communicating with the atmosphere), and which communicates with the valve seat, 13, and by a lateral passage, 19, with the valve seat, 16, at the opposite end of the piston hub. 20 represents the valve actuating part consisting in this instance of a valve sleeve passing through a stuffing box, 21, in the cylinder head at the opposite end of the cylinder from the stuffing box, 6, said sleeve also extending longitudinally through the piston hub, the chambers thereof, and through the hollow piston rod, 5, and is movable longitudinally with respect thereto to effect the operation of the reversing valves. The valve sleeve is preferably made in two parts, 20 and 20ª, connected by threaded projections, 23 and 23ª, of a centrally located collar, 22, in the suction chamber, 17, thus uniting the sleeve sections and preventing communication between them. The collar, 22, is provided with one or more lateral passages, 24, communicating with the interior of the sleeve section, 20ª, and longitudinal passage, 25, in one of the plugs, (23ª) the said lateral passages, 24, communicating with the interior of the suction chamber, 17, which is of sufficiently greater diameter than the collar, 22, providing annular space within the chamber surrounding the collar. The outer end of the sleeve section, 20ª, is provided with a lateral outlet passage, 26, to the source of suction. The section, 20, of the valve actuating sleeve is provided with an aperture, 27, communicating with the higher pressure chamber, 18, and said valve sleeve section, 20, extends outwardly through the hollow piston rod, 5 (see Fig. 4), and is provided exteriorly thereto with one or more air inlet apertures, 27ª, thereby placing the chamber, 18, of the valve mechanism in communication with the atmosphere at all times. The suction chamber, 17, is adapted to be connected with the cylinder on opposite sides of the piston by means of a port, or ports, 34, in the valve seat, 14, and a port, or ports, 35, in the valve seat, 15. The valve seat, 13, is provided with a port, or ports, 36, communicating with the cylinder on one side of the piston and the valve seat, 16, communicates with the cylinder on the other side of the piston through an annular passage, 33. Each of the valve chambers is provided with a pair of oppositely disposed poppet valves, preferably conical, engaging the respective valve seats, said valves being loose on the valve actuating sleeve. The valves are indicated at 40, 41, 42 and 43. Each of these valves is held seated by a yielding means, and means are also provided for sealing the opening in the valve through which the valve actuating sleeve passes, as set forth in our former application above referred to. In the present instance we have shown a rubber cushioning device, 50, of elastic rubber, interposed between the valves, 40 and 41, and between the valves, 42 and 43, said cushioning devices fitting tightly on the outer surfaces of the valves and valve actuating sleeve and serving the combined purpose of retracting spring and sealing means. The actuating sleeve is provided with suitable means for opening one valve of each pair when the valve sleeve is moved in either direction. This function is performed by the collar, 22, located centrally between the valves, 41 and 42, and end collars, 29 and 32, mounted on the valve sleeve outside of the valves, 43 and 40, respectively. From the foregoing it will be noted that when the valve sleeve is moved in either direction one of the centrally located valves, 41 or 42, and one of the end valves 40, and 43, will be opened simultaneously, thereby placing one end of the cylinder in communication with the suction chamber, 17, and the opposite end of the cylinder in communication with the atmosphere and causing a corresponding movement of the piston in the same direction as that in which the valve actuating sleeve is moved. Conversely, the movement of the valve sleeve in the opposite direction reverses the valve mechanism and effects the movement of the piston in the opposite direction, while normally all four of the valves are seated and the piston is held stationary. As before stated, the specific construction of the actuator above described, forms no part of our present invention, and is not herein specifically claimed.

Referring now to Fig. 1 and Figs. 4, 5, 6 and 7, illustrating details of the mechanism shown in Fig. 1, 60 represents the internal combustion engine of an automotive vehicle, providing the customary suction passage between the throttle valve and the cylinders, and extending through the usual intake manifold, indicated at 61, which forms the convenient source of suction for operating the power actuator. In this installation, the intake manifold is connected by a pipe, 62, with a suction storage tank, 63, an adjustable regulating valve, 64, and a check valve, 65, being located in said pipe, and the tank, 63, being connected by a pipe of larger diameter, indicated at 66, with the interior of the valve sleeve section, 20ª, through the lateral orifice, 26, therein.

We prefer to insert in the connections between the source of suction, as the intake manifold, and the suction storage space, in this instance the tank, a check valve provided with a spring which normally holds the valve closed, and which will only permit to open after a predetermined degree of rarefaction has been reached. One form of this check valve is illustrated in Fig. 14, in which the valve proper, indicated at 67, shown as a hinged or flat valve, is provided with a spring, 68, holding it in closed position with a predetermined pressure, which may be obtained by calibrating the spring, but we prefer in some instances to provide the spring with an adjusting screw, 69, by which the tension may be set to the desired resistance. The object of this type of check valve is that in starting the internal combustion engine, with the throttle practically closed, as customary, the air will be exhausted from the actuator and storage force of the operator by merely overcoming the usual retracting spring and the friction of the working parts (the check valve, 67, and relief valve, 67ª, are not specifically claimed herein, as they form the subject matter of a separate application filed by us June 10, 1926, Serial No. 114,934).

70 represents one of the brake drums of the ordinary brake mechanism with which the automotive vehicles are provided, 71, the brake band, and 72, the lever for applying and releasing the brake band which is connected in any desired way, as by link, 73, to brake actuating and power amplifying lever mechanism, consisting in this instance of a pair of levers, 74, mounted on a supporting shaft, 75, and having their upwardly extending arms 76, connected by a pin, or cross bar, 77, for joint operation, the said upwardly extending arms being connected with the brake link, 73, in this instance by means of a yoke, 78, engaging the cross bar, 77. Each of the levers, 74, comprises also a downwardly extending power multiplying arm of greater length than the short arm, 76, and connected to the piston of the actuator so that the power of the actuator may be multiplied to the desired extent. We may form the lever arms, 74, with provision for connecting them with the power actuator under different conditions to vary the leverage to suit the particular installation, as for example, by providing each of the levers, 74, with a plurality of apertures, 79, at different distances from the shaft, 75, or the levers may be constructed with the lower arms of different lengths according to the particular installation and the leverage desired therefor. In the figures under consideration we have shown the piston rod, 5, of the actuator, provided at its outer end with a clamping collar, 80, provided with lateral studs, 81, having cotter pins, 82, in their outer ends, said studs engaging apertures in the end of space, either simultaneously with the mixture from the carburetor, diluting it, or if the throttle valve is tightly closed, the air will be exhausted before any suction through the carburetor takes place. The result in either case is delay in getting an operative explosive mixture to the cylinders. With this form of check valve, the valve, 67, would remain closed when the engine was being started, thus preventing the dilution or delay of the explosive charge, and the valve, 67, would not open until the engine had started.

If the foot lever is operated when the engine is not running, and the throttle and inlet valves of the motor are closed, or there is not sufficient suction in the tank to operate the power actuator, the brake mechanism must be applied by the physical power of the operator. In such case the forward movement of the piston by the foot lever would have to compress the air expelled from the cylinder to the extent necessary to open the check valve, 67, and this pressure would have a retarding effect on the operation of the brake mechanism by the physical force of the operator, increase the physical force required of the operator. To prevent this, we prefer to provide a normally closed relief valve, 67ª, which may be a ball valve held closed by a very light spring, and located between the actuator cylinder and check valve, 67, preferably on the tank, 63, or on the body of the check valve, as shown in Fig. 14. This valve would be held firmly closed during the normal operations of the apparatus by the presence of a partial vacuum in the tank, 63, in addition to the effect of the light spring, but if under the circumstances above noted, any pressure is produced in the tank, 63, the valve, 67ª, will instantly open, thus venting the tank and the cylinder of the actuator so that the actuator may be moved, and the brake mechanism may be operated by the physical a yoke, 83, provided with a collar, 84, threaded internally to receive a connecting sleeve, 85, the forward end of which is screwed into a collar, 86, on a yoke, 87, the forward ends of which are pivotally connected with the brake actuating levers, 74, by bolts and nuts passing through one or other of the apertures, 79, therein, and this construction may be conveniently employed whereas in this case, the valve actuating sleeve is brought out of the cylinder through the hollow piston.

For the purpose of actuating the valve mechanism, we employ a foot lever, 88, which in this instance is pivoted on the shaft, 75, between the levers, 74, and extends upwardly through the yoke, 78, and is provided with the usual retracting spring, 89, and an adjustable stop, 90, in this instance an adjusting screw secured to the floor board being illustrated for the purpose. The foot lever is provided with a downwardly extending arm, 91, connected by a yoke, 92, with a rod or link, 93, the rear end of which is connected to the sleeve, 20, see Fig. 4, so that the operation of the foot lever affects the shifting of the reversing valve mechanism of the actuator and results in a corresponding movement of the piston, which is transmitted to the brake mechanism and is multiplied to the desired extent according to difference in length between the upwardly and downwardly extending arms of the brake applying levers. The foot lever, 88, has a slight movement with respect to the brake applying lever or levers, before coming into contact with the cross bar, 77, thus providing the necessary amount of lost motion to actuate the valve mechanism. In order that this may be accurately adjusted, we prefer to provide the foot lever with a set screw, 94, for engaging the cross bar, 77, said set screw may be omitted, and the forward edge of the foot lever may be in contact directly with the cross bar, 77, if desired. It will be seen that when the foot lever, 88, is pressed forward in the direction of the arrow in Fig. 5, it will first actuate the valve mechanism of the actuator and the movement of the piston in the same direction will be effected by suction, thus applying the brake mechanism to the extent of the movement of the foot lever. As soon as the piston has moved far enough to permit the valve to close, the movement of the piston will cease, and the parts will remain in this position until the foot lever, 88, is moved further forward, in which case the piston will again move forward, or is released and permitted to move rearwardly, by its retracting spring. The return movement of the piston will follow until the valves are again brought into their neutral or normal position. When the brakes are applied by the actuator to the fullest extent, the operator, by further depressing the foot lever, 88, until he establishes contact with the cross bar, 77, may add his physical force to the force exerted by the actuator when desired. It will also be noted that if the power fails for any reason when the foot lever, 88, is moved forward to shift the valve mechanism, the further forward movement of the foot lever, 88, by the foot of the operator will establish contact between the foot lever and the cross bar, 77, of the brake applying lever or levers, 74, and will thus enable the operator by physical force to directly apply the brake mechanism by positively operating the brake applying lever, or levers, 74, and simultaneously move the piston to the desired extent, the valves having previously been moved into the desired position to permit of the movement of the piston without compression or rarefication, in the cylinder. The valve sleeve section, 20ª, is preferably provided with a stop, in this instance in the form of a collar, 95, secured thereto and adapted to engage the stuffing box, 21, to prevent injury to the valves should the adjusting screws, 90 and 94, get out of proper adjustment.

Figs. 8 and 9 illustrate a slight modification of our invention adapted for use where the operative connections to the piston rod and valve actuating rod are not arranged concentrically, as previously described. As shown in Fig. 9, the hollow piston rod, 105, is provided with the air inlet apertures, 127ª, and the piston rod is connected by a rod, 185, provided at its forward end with a yoke, 187, with the lower end of the brake actuating lever, 174, as shown in Fig. 8, pivotally mounted on the shaft, 175, and provided with the short actuating arm, 176, which is connected by means of a rod, 173, with the brake mechanism, the rod, 174, being shown provided with a plurality of apertures, 179, for adjusting the leverage between the actuator and the brake mechanism.

As shown in Figs. 8 and 9, the mechanism for operating the valve actuating sleeve is located at one side of the piston rod connection as above described. In Fig. 9, the section, 120ª, of the valve sleeve, extending from the cylinder at the opposite end from the piston rod and to which the suction pipe, 166, is provided with a bracket arm, 120ᵇ, to which is secured a connecting rod, 193, extending through one of the hollow bolts, 102ª, of the cylinder head, the said rod being pivotally connected to a link rod, 193ª, provided at its forward end with a yoke, 192, which is pivotally connected to the lower end, 191, of the foot lever, 188, said foot lever being provided with the retracting spring 189, and the adjustable stop, 190, as previously described in connection with the foot lever. The rod, 102ª, is conveniently provided with a retracting spring, 102ᵇ, in any usual or desired manner, which tends to return the valve sleeve and reversing valve mechanism to normal or "off" position. The valve sleeve section, 120ª, is also provided with a stop collar, 195. The foot lever, 188, is in this instance provided with a lateral arm, or bracket, 188ª, which extends over the upper arm, 176, of the brake applying lever and may directly engage the same, but is preferably provided with a set screw, 194, for adjusting the extent of lost motion between the foot lever, 188, and the brake applying lever, 174—176. The operation of the apparatus shown in Figs. 8 and 9 is identical with that previously described.

In some instances it is desirable to arrange the power actuator adjacent to the internal combustion engine and forward of the brake applying, power amplifying lever, and in Figs. 10 to 13 we have shown a further modification of our invention adapted particularly to this arrangement. In Fig. 10 we have shown a diagrammatic arrangement of the apparatus similar to that illustrated in Fig. 1, the internal combustion engine being indicated at 260, the intake manifold at 261, connected by pipe, 262, containing the adjustable regulating valve, 264, and check valve, 265, with the vacuum tank, 263, which is connected by pipe, 266, to the actuator through the connection, 226, with the valve sleeve section, 220ª. In this instance the actuator, indicated at 201, is constructed as shown in Figs. 2 and 3, except that its position is simply reversed on account of the fact that it is placed forward of the brake actuating lever, indicated at 274, in order that the hollow piston rod, 205, may project rearwardly. In this instance we have shown the brake applying and power amplifying lever, 274, pivotally mounted at its lower end upon a bracket, 274ª, secured to a part of the frame work of the vehicle and connected at its upper end by a rod, 285, with the hollow piston rod, 205, the lever being provided with a plurality of holes, 279, if desired, for varying the leverage between the actuator and the brake mechanism. In this instance the brake mechanism, indicated in Fig. 10 at 270, 271 and 272, is connected by a rod, 273, or link, with the lever, 274, at a point adjacent to the fulcrum of the lever, said lever being conveniently provided, if desired, with a plurality of holes, indicated at 274ᵇ, for varying the position of the pivotal connection between the lever, 274, and the link or rod, 273, if desired. In this instance the foot lever, indicated at 288, is pivoted at 275, directly to the lever, 274, between its ends by means of a suitable bolt, and the lever, 274, is shown in this instance provided with additional holes, 274ᶜ, to receive this bolt, so that the relative position of the foot lever with respect to the brake applying lever may be varied, if desired. The foot lever is provided with the usual retracting spring, indicated at 289, and will be stopped by the engagement of the valve sleeve collar, 226, with the adjustable stuffing box of the actuator cylinder and the brake applying lever, 274, is provided with an adjustable stop, 290. As clearly indicated in Fig. 11, there is slight lost motion between the foot lever, 288, and brake applying lever, 274, permitting the foot lever to be moved in the direction of the arrow in Fig. 11, as desired, coming in contact with the brake applying lever, 274, and the foot lever, is shown in this instance provided with a set screw, 294, for adjusting the extent of this lost motion, if desired. The foot lever is connected by a link or rod, 293, with the valve actuating sleeve section, 220, which in this instance extends through the hollow piston rod, 205. As shown, the rod, 293, is connected to the sleeve, 220, by universal connection, 293ª, and to the foot lever by a yoke, 292, pivotally secured thereto by a bolt which passes through a hole in the foot lever. Additional holes, indicated at 288ª, are provided for enabling the connection between the rod, 293, and foot lever, to be adjusted to accommodate the other adjustments shown and hereinbefore referred to. In order to accommodate the connection of the rod, 293, with the valve sleeve section 220, the forward end of the rod, 285, extending from the brake applying lever, 274, to the hollow piston rod, 205, preferably provided with the yoke, 287, of sufficient length to permit the longitudinal movement of the valve sleeve, 220, and universal connection, 293, with respect to the hollow piston rod, 205, and connecting rod, 285, clearly indicated in Fig. 13.

The parts indicated in Figs. 10 and 13, inclusive, operate in the same manner hereinbefore described to effect the application and release of the brake mechanism. When the operator places his foot on the foot lever, 288, and moves it forward in the direction of the arrow, Fig. 11, the valve actuating rod, 220, is first operated for the purpose of shifting the reversing valve mechanism into position to produce a movement of the piston of the actuator in the same direction. The piston immediately moves forward in the direction of the arrow, carrying with it the upper end of the brake applying lever, 274, which, by reason of the connection between said lever and the brake rod, 273, applies the brake mechanism amplifying the power of the actuator to the desired extent. After the actuator has exerted its full power on the brake mechanism, the operator may still press the foot lever forward so as to take up the lost motion between it and the brake applying lever, 274; and thereby add his physical power to the power exerted by the actuator. When the lost motion is taken up between the foot lever, 288, and the brake applying lever, 274, the two levers act as one and the physical power of the operator will be applied at a considerably greater leverage than the power of the actuator. It will also be understood that should the power actuator fail to operate for any reason, when the operator presses his foot on the foot lever, 288, and sets the reversing valve, the continued pressure of the operator's foot on the foot lever will take up the lost motion between the levers, 288 and 274, as before described, and the operator will positively move the piston and the brake link, or rod, 273, with the increased leverage before referred to, thereby enabling him to positively apply the brake mechanism under very favorable circumstances by reason of such increased leverage as his physical power will be applied with greater leverage than the power of the actuator. This prevents the possibility of failure of the brake mechanism, even though the actuator may for any reason become inoperative or less efficient. By providing the various parts with the additional adjusting apertures shown, the leverage at which the power of the actuator and the physical power of the operator are applied, can be varied to a considerable extent according to the requirements of the installation, but it is obvious that proportions and relations of the various parts can be worked out in advance for different installations if desired, in which case the additional holes in the levers, 274 and 288, herein shown, may be dispensed with and the parts made and assembled in the desired relations and with the desired leverages for the actuator and foot lever.

The valve actuating connecting rod, 293, might, if desired, be connected to the opposite end of the valve actuating sleeve, as for example by means of a sliding rod and bracket like those shown at 193 and 120ᵇ, in Fig. 9, the rod, 293, taking the place of the rod, 193ᵃ, in that figure.

What we claim and desire to secure by Letters Patent is:—

1. The combination with a brake mechanism, a power actuator for the same comprising a cylinder, a piston therein, and controlling valve mechanism, a pivoted power amplifying lever, connections therefrom to the brake mechanism, connections from said amplifying lever at a point further from its pivotal axis extending to the piston of the actuator, an operator operated lever pivoted to said amplifying lever and extending beyond the same, connections from the operator operated lever to the said valve mechanism, said levers having normally separated interengageable parts, providing for lost motion between them, and means for varying the position of the pivotal axis of the operator operated lever with respect to the amplifying lever, and the points of connection of the brake and piston connections with the latter.

2. The combination with a brake mechanism, a power actuator for the same comprising a cylinder, a piston therein, and controlling valve mechanism, a pivoted power amplifying lever, connections therefrom to the brake mechanism, connections from said amplifying lever at a point further from its pivotal axis extending to the piston of the actuator, an operator operated lever pivoted to said amplifying lever and extending beyond the same, connections from the operator operated lever to the said valve mechanism, said levers having normally separated interengageable parts, providing for lost motion between them, and means for varying the position of the pivotal axis of the operator operated lever with respect to the amplifying lever, and means for varying the leverage of said amplifying lever with respect to the brake mechanism.

3. The combination with a brake mechanism, a power actuator for the same comprising a cylinder, a piston therein, and controlling valve mechanism, a pivoted power amplifying lever, connections therefrom to the brake mechanism, connections from said amplifying lever at a point further from its pivotal axis extending to the piston of the actuator, an operator operated lever pivoted to said amplifying lever and extending beyond the same, connections from the operator operated lever to the said valve mechanism, said levers having normally separated interengageable parts, providing for lost motion between them, and means for varying the position of the pivotal axis of the operator operated lever with respect to the amplifying lever, and adjustable means for varying the extent of lost motion between said levers.

4. The combination with a brake mechanism, a power actuator for the same comprising a cylinder, a piston therein, and controlling valve mechanism, a pivoted power amplifying lever, connections therefrom to the brake mechanism, connections from said amplifying lever at a point further from its pivotal axis extending to the piston of the actuator, an operator operated lever pivoted to said amplifying lever and extending beyond the same, connections from the operator operated lever to the said valve mechanism, said levers having normally separated interengageable parts, providing for lost motion between them, and means for varying the position of the pivotal axis of the operator operated lever with respect to the amplifying lever, means for varying the leverage of said amplifying lever with respect to the piston of the actuator and with respect to the brake mechanism, and adjustable means for varying the extent of lost motion between said levers.

5. In a brake system for automotive vehicles, the combination with brake mechanism, a power actuator for operating the same, and controlling valve mechanism for the actuator, of a pivoted power amplifying lever, connections therefrom to the brake mechanism, connections from said lever at a point further from its pivotal axis extending to a movable power applying part of the actuator, a pivoted operator operated lever pivotally mounted upon said power applying lever, connected with said valve mechanism and extending beyond the power applying lever, said levers having normally separated interengageable parts providing lost motion between them, said levers moving together about a common axis when said lost motion is taken up to apply the physical force of the operator to the brake mechanism with increased leverage.

6. In a brake system for automotive vehicles, the combination with brake mechanism, a power actuator for operating the same, and controlling valve mechanism for the actuator, of a pivoted power amplifying lever, connections therefrom to the brake mechanism, connections from said lever at a point further from its pivotal axis extending to a movable power applying part of the actuator, a pivoted operator operated lever pivotally mounted upon said power applying lever, connected with said valve mechanism and extending beyond the power applying lever, and provided with an adjustable part for directly engaging the power applying lever and normally held separated therefrom to provide lost motion between them, said levers moving together about a common pivotal axis when said lost motion is taken up to enable the operator to apply his physical force to the brake mechanism with increased leverage.

7. In an automotive vehicle, the combination with a pair of separately movable cooperating controlling levers, of a diaphragm chamber device operatively connected with one of said levers, and means cooperating with both of said levers for controlling the operation of said device.

In testimony whereof we affix our signatures.

CALEB S. BRAGG.
VICTOR W. KLIESRATH.